April 12, 1932.  E. G. WATROUS  1,853,246
FAUCET
Filed March 18, 1929

Inventor
Earl G. Watrous,
By Glenn S. Noble
Atty.

Patented Apr. 12, 1932

1,853,246

UNITED STATES PATENT OFFICE

EARL G. WATROUS, OF CHICAGO, ILLINOIS

FAUCET

Application filed March 18, 1929. Serial No. 348,057.

This invention relates to faucets used for various purposes and particularly to the valve portions thereof. Heretofore it has been the more or less common practice to make faucets such as commonly used in connection with lavatories or laundry tubs, with a worm or threaded portion formed integrally with the valve stem and to close the valve against the pressure of the water, but such construction is not only expensive but has proven objectionable in use.

The objects of the present invention are to improve the general construction of faucets of this character; to provide a faucet having its valve closing with the pressure instead of against the pressure; to provide a valve having a valve stem with separately formed threaded members for causing longitudinal movement of the stem; to provide a faucet having valves with threaded actuating members formed from tubing; to provide a faucet having a plurality of inlets leading to a common outlet and having valves which may be readily applied or removed; and to provide such other improved details of construction and arrangement of the parts as will appear more fully from the following specification.

Figure 1:
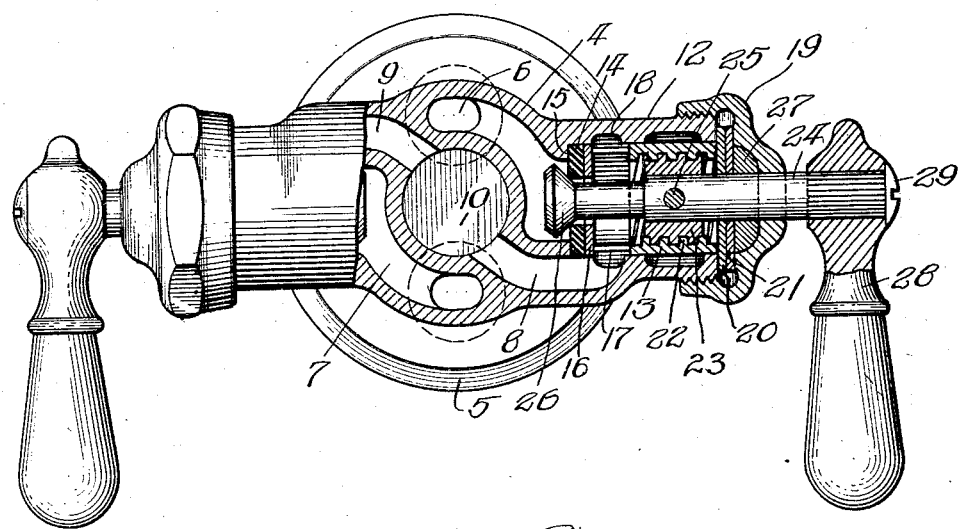
Figure 2:
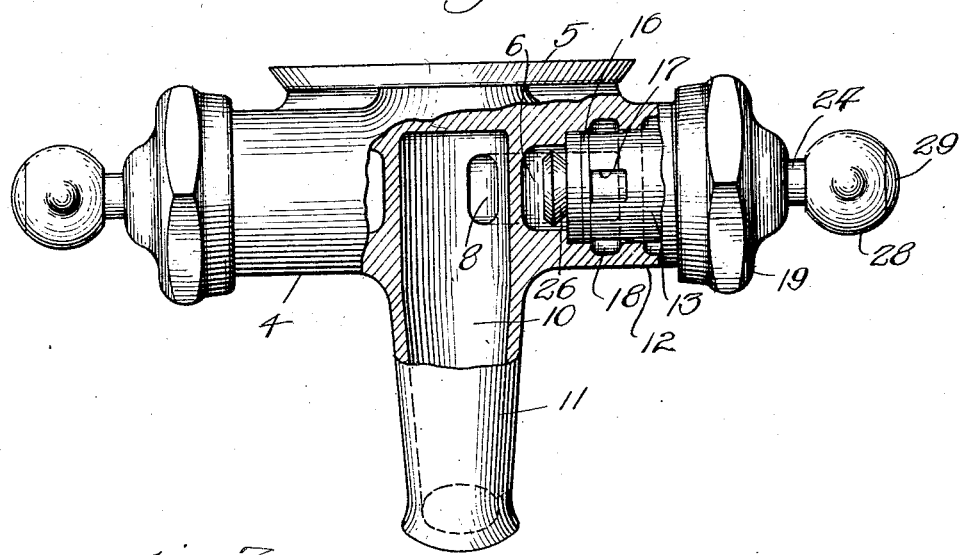
Figure 3:
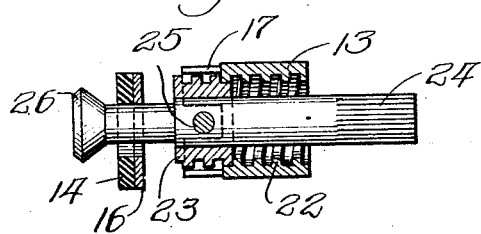

In the accompanying drawings illustrating this invention, Fig. 1 is a front view of a double faucet with parts broken away or shown in section; Fig. 2 is a plan view also with parts broken away for convenience in illustration; and Fig. 3 is a detail illustrating the method of assembling the valve operating devices.

In the particular form of faucet shown in these drawings, the faucet body 4 has a back plate 5 for attachment to the lavatory or support. One inlet or passageway 6 leads to the valve at the right hand end of the faucet and another inlet or passageway 7 leads to the valve at the left hand end of the faucet. The outlets 8 and 9 from the respective valves lead through a common central discharge opening 10 to the discharge spout 11. This provides a convenient arrangement for hot and cold water, and as the valves are duplicates, only one will be described. The faucet body 4 has a substantially cylindrical valve chamber 12 with a central bore for receiving a tubular valve cage or sleeve 13. A ring or disk 14 which constitutes the valve seat is interposed between the sleeve 13 and a shoulder 15 formed at the inner end of the bore of the valve chamber. This valve seat is preferably formed of hard rubber, fibre or the like, and for this reason a metallic washer 16 is inserted between the same and the end of the sleeve. The sleeve or cage 13 has one or more holes or notches 17 which register with an annular outlet channel 18 which connects with the outlet 8. The outer end of the valve chamber 12 is threaded for engagement with a cap or valve packing nut 19. A packing washer 20 and metal washer 21 are placed between the nut 19 and the end of the valve body 12. The inner washer also engages with the end of the sleeve 13 and presses the sleeve against the washer 16 and valve seat 14, thereby holding these parts securely and tightly in position.

The sleeve or cage 13 is provided at its outer end with threads 22 which are engaged by the threads of a stem screw 23. This screw is secured to the stem 24 by a pin 25. The stem 24 is provided at its inner end with the valve or closure 26 which is preferably formed integrally therewith and which is arranged to close with the pressure of the water in the pipes. A suitable packing 27 is placed in the cap or nut 19 to make a tight closure between the same and the stem. The outer end of the stem 24 is knurled or otherwise prepared to receive the handle 28 which is secured by means of a screw 29 in the usual manner.

The valve chamber 12 may be cored to provide the annular recesses as shown which also reduces the cost of finishing to receive the inner parts. The worm or screw 23 and the sleeve 13 may be readily formed from tubing so that these parts are cheap to manufacture. When the valve parts are to be assembled, the rings or washers 14 and 16 are placed over the valve stem, as shown in Figure 3, and the pin 25 is inserted in position through the worm, and the worm with the pin therein are then screwed into the inner end of the sleeve 13, and finally all of these parts are inserted in the valve chamber, preparatory to being fastened in position by the cap or nut 19. In the construction shown the valve stem is reduced between the valve and screw to provide ample clearance or space for water to pass around the same.

The faucet valves are operated in the usual manner, as by turning the handle in one direction the valve will be opened, which will permit the water to pass from the inlet opening therethrough to the outlet opening or spout. When the handle is turned in the opposite direction, the valve 26 will be drawn against the valve seat 15 and the pressure of the water being against the same further tends to make a tight closure so that the valves are not apt to leak.

My improved faucets may be made in various forms which will include such novel features as set forth in the following claim, in which I claim:

A faucet comprising a body having a cylindrical projection thereon with an annular abutment adjacent to the inner end, a valve ring fitting in the projection and against said abutment and having a valve seat therein, a cage fitting in the projection and having openings at its inner end registering with an annular recess in the projection and having threads in the outer end thereof only, a washer engaging with the outer ends of the projection and cage, a threaded cap engaging with the cylindrical projection and adapted to press the last named washer inwardly, a tapered valve on the inlet side of the valve ring and having a stem projecting outwardly through the cage and cap, said stem being smooth and free from threads, a sleeve fitting closely over the stem and having threads for engagement with the threads in said cage, a pin extending through the sleeve and stem to hold the parts together and a handle for said stem, said faucet having an inlet passageway leading to the cylindrical projection and an outlet passageway from the annular recess to the faucet spout.

EARL G. WATROUS.